United States Patent
Adris et al.

(10) Patent No.: US 6,977,064 B1
(45) Date of Patent: *Dec. 20, 2005

(54) APPARATUS FOR THE CONTROLLED OPTIMIZED ADDITION OF REACTANTS IN CONTINUOUS FLOW REACTION SYSTEMS

(75) Inventors: Alaa Eldin M. Adris, Riyadh (SA); Fahad A. Al-Sherehy, Riyadh (SA); Mustafa A. Soliman, Riyadh (SA); Tarique Hakeem, Riyadh (SA); Shickh Kareemuddin, Riyadh (SA); Abdullah A. Al-Nutaifi, Riyadh (SA); Munawwar Saudagar, Riyadh (SA); Shahid M. Azam, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,779

(22) Filed: May 5, 2000

(51) Int. Cl.⁷ .............................. B01J 10/00; F28B 7/00
(52) U.S. Cl. .................. 422/196; 422/198; 422/145; 422/171; 422/197; 422/240; 422/200; 422/146; 422/147; 422/195; 210/761
(58) Field of Search ................ 210/761; 423/652, 423/344, 345; 422/196, 197, 198, 145, 171, 422/240, 200, 146, 147, 195

(56) References Cited

U.S. PATENT DOCUMENTS

| | | | |
|---|---|---|---|
| 2,518,583 A | 8/1950 | Watson | |
| 2,596,299 A | * 5/1952 | Simpson | 422/200 |
| 3,162,683 A | 12/1964 | Ciocchetti | |
| 3,513,145 A | 5/1970 | Crawford | |
| 3,679,651 A | 7/1972 | Kii et al. | |
| 3,838,139 A | 9/1974 | Latinen | |
| 3,844,936 A | 10/1974 | Newson | |
| 4,011,284 A | 3/1977 | Gawne | |
| 4,056,602 A | 11/1977 | Matovich | |
| 4,102,652 A | 7/1978 | Vogl | |
| 4,196,170 A | 4/1980 | Cemenska | |
| 4,250,346 A | 2/1981 | Young et al. | |
| 4,370,470 A | 1/1983 | Vidaurri et al. | |
| 4,692,306 A | 9/1987 | Minet et al. | |
| 4,818,495 A | 4/1989 | Iya | |
| 4,818,511 A | 4/1989 | Nishi et al. | |
| 4,899,003 A | 2/1990 | Manyik et al. | |
| 4,981,676 A | 1/1991 | Minet et al. | |
| 5,084,134 A | 1/1992 | Mattiussi | |

(Continued)

FOREIGN PATENT DOCUMENTS

EP        0 330 751 A2        9/1989

(Continued)

*Primary Examiner*—Glenn Caldarola
*Assistant Examiner*—Alexis Wachtel
(74) *Attorney, Agent, or Firm*—Kramer Levin; Naftalis & Frankel LLP

(57) ABSTRACT

An apparatus for performing continuous flow chemical reactions such as oxidation, oxidative dehydrogenation and partial oxidation processes involving a reactor design characterized by controlled/optimized addition of a reactant with the objective of: (i) avoiding the explosion regime of the reactant mixture (e.g., hydrocarbon/oxidant mixture); (ii) maximizing the selectivity of the reaction to the desired product; (iii) limiting the reactor temperature gradient and therefore the threat of reaction runaway; and (iv) controlling the operating temperature of the reaction zone so that desirable temperature range is maintained over the entire zone.

19 Claims, 12 Drawing Sheets

U.S. PATENT DOCUMENTS

| | | | |
|---|---|---|---|
| 5,202,517 A | | 4/1993 | Minet et al. |
| 5,229,102 A | | 7/1993 | Minet et al. |
| 5,384,051 A | * | 1/1995 | McGinness ................ 210/761 |
| 5,583,240 A | | 12/1996 | Asher et al. |
| 5,622,677 A | * | 4/1997 | Hadjigeorge ................ 422/144 |
| 5,723,094 A | | 3/1998 | Sunavala |

FOREIGN PATENT DOCUMENTS

| | | |
|---|---|---|
| EP | 0 383 224 | 8/1990 |
| EP | 0 532 325 | 3/1993 |
| EP | 0546 677 | 6/1993 |
| GB | 1 063 297 A | 3/1967 |

* cited by examiner

APPARATUS FOR THE CONTROLLED OPTIMIZED ADDITION OF REACTANTS IN CONTINUOUS FLOW REACTION SYSTEMS

BACKGROUND OF THE INVENTION

1. Field of the Invention

The present invention relates to an improved continuous flow chemical reaction apparatus wherein the introduction of at least one reactant feed into the reaction zone is optimized. The invention also relates to improved chemical reactions achieved using the continuous flow chemical reaction apparatus.

2. Description of Related Art

Several publications are referenced in this application. The references describe the state of the art to which this invention pertains, and are hereby incorporated by reference.

An oxidative dehydrogenation, or partial oxidation, process is a one step conversion of light hydrocarbons to olefins and carboxylic acids. The process potentially offers many advantages over cracking and pure dehydrogenation which are extremely capital intensive and energy intensive. The conversion of saturated hydrocarbons into olefins and carboxylic acids over low temperature catalysts was disclosed by Thorstienson et al. in a report published in *Journal of Catalysis*, vol. 52, pp. 116–132 (1978).

U.S. Pat. No. 4,250,346 discloses a process for oxidative dehydrogenation of ethane to ethylene suggesting different low temperature catalyst systems. European Patent No. EP 0 518 548 A2 discloses a process for making acetic acid which comprises oxidizing ethane with molecular oxygen in a reaction zone at a pressure at least 100 psig while the reactants are in contact with a solid catalyst containing vanadium and phosphorous oxides (VPO system).

The oxidative dehydrogenation reaction, however, raises problems such as: (a) removal of the exothermic heat of reaction, (b) possible associated temperature runaway, (c) control of selectivity to desired product, and (d) limiting the formation of undesired oxygenated by-products and carbon oxides.

Another problem which is associated with oxydehydrogenation processes, as well as oxidation processes, is the limitation on the oxidant to hydrocarbon feed ratios which is imposed by the explosive mixture formation constraint. This problem compromises the ability of the process to achieve optimality of feed compositions that satisfy the stoichiometric and kinetic requirements of the reaction, yet avoid compositions which can lead to autoignition, deflagration, and detonation.

These problems have been addressed in a number of patents. Each tried to overcome one or more of the difficulties mentioned above by proposing a modified reactor system or different reactor arrangement.

U.S. Pat. No. 4,899,003 issued to Union Carbide relates to multi-staging the reactor system where a feed gas comprising ethane and oxygen is converted over an oxydehydrogenation catalyst to a product gas comprising ethylene, acetic acid, water, ethane, and carbon oxides. The product gas from each stage (other than the last stage) is cooled and a portion of the acetic acid and water is separated and oxygen is added before passing the product gas stream to the next reaction stage. Total oxygen content in the feed stream to any of the reactors was maintained below 6 mole percent with respect to the total input gaseous stream in that stage.

U.S. Pat. No. 5,583,240 issued to SRI relates to a reactor with porous membranes to provide for the continuous addition of one reactant all along the reactor and mixing in the entire volume of the reactor to minimize or eliminate local high concentration gradients and hot spots. The other reactant is flowed through the inside of the permeation tube, which contains mixing elements. Those mixing elements were claimed to increase the yield of desired product by increasing the heat and mass transfer rates.

European Patent No. EP 546 677 A1 relates to a fluidized bed for ethane oxidation to acetic acid. The disclosed process included three key steps: (1) cooling the gaseous effluent from the reaction zone; (2) separating most of the acetic acid in liquid form from the effluent gases, leaving a gaseous stream containing nearly all of the carbon oxide contained in the effluent; (3) purging a small portion of said gaseous stream and recycling most of the gaseous stream as part of the feed to the reaction zone. Purging is intended to prevent build-up of carbon oxides in the reaction zone, while recycling serves to maintain a high proportion of carbon oxides in the reaction zone gases, thus aiding in moderating the temperature elevating effect of the highly exothermic oxidation reaction.

U.S. Pat. No. 5,723,094 relates to a chemical reactor design which provides improved micro-mixing conditions and reduced localized zones of concentration to increase reaction selectivity to desired products. The design includes a capillary tubelet positioned within and along the length of flow tubes positioned in a shell reactor and one or more distributors for distributing a first reactant into the flow tubes and a second reactant into the capillary tubes.

European Patent Publication No. 0 532 325 relates to a method and apparatus for the production of ethylene oxide. European Patent Publication No. 0 383 224 relates to a shell-and-tube reactor and method of using the same.

It would be desirable to provide a continuous flow chemical reaction system which provides optimality of feed compositions along a substantial portion of the reaction zone and satisfies the stoichiometric and kinetics requirements of the reaction while maintaining the reaction mixture within the explosive mixture formation constraint and thus avoid reactant mixtures which can lead to autoignition, deflagration, and detonation.

OBJECTS OF THE INVENTION

It is an object of the invention to overcome the above-identified deficiencies.

It is another object of the invention to provide an improved continuous flow chemical reaction apparatus and method of using the same.

It is another object of the invention to provide an improved continuous flow chemical reaction system where a controlled amount of at least one fluid reactant is introduced into the reaction zone at more than one location.

It is another object of the invention to provide an improved continuous flow chemical reaction where a controlled, optimized amount of at least one fluid reactant is introduced into the reaction zone at more than one location.

It is a further object of the invention to provide an improved continuous flow chemical system for performing a catalytic reaction where at least one fluid reactant is introduced into the reaction zone at more than one location.

It is a still further object of the invention to provide an apparatus in which one or more of the reactants is fed in an optimized distributed fashion to meet certain safety and performance requirements.

It is yet another object of the invention to provide a reactor which achieves a catalyst bed temperature profile controlled by means of non-uniform reactant(s) distribution so that desired operating temperature range is achieved along the entire length of the reactor tube.

It is a still further object of the invention to provide an improved continuous flow chemical reaction system which provides optimality of reacting mixture compositions along a substantial portion of the reaction zone and satisfies the stoichiometric and kinetics requirements of the reaction.

It is a still further object of the invention to provide a reactor and reaction process wherein the total overall inventory of the reacting mixture falls within an unsafe/explosive composition region, while at any given point or region within the reactor the compositional mixture is within the domain of safe/non-explosive compositions.

The foregoing and other objects and advantages of the invention will be set forth in or apparent from the following description.

SUMMARY OF THE INVENTION

The present invention relates to a process and apparatus for the controlled/optimized addition of reactant(s) in continuous flow chemical reactions, preferably oxidative dehydrogenation, partial oxidation, or oxidation reactions. More specifically, the invention deals with the shortcomings of these high potential processes by the controlled addition of a reactant which is achieved by means of an injection member (tube) along the length of the reaction zone. The injection member (tube) is provided with injector(s) capable of introducing a controlled amount of reactant at the injector site into the reaction zone. Preferably, the injection member (tube) is provided with wall penetrations, holes, perforations, spargers, capable of performing two functions: (1) pressure drop control and (2) flow control. According to one preferred embodiment, the injectors allow for the introduction of a controlled amount of reactant into the reaction zone without allowing any reactant(s) to flow into the injector member (tube) from the reaction zone.

The present design offers a high degree of controllability over the quantity of reactant injection and the locations of the points of injection by adjusting the distance between the injection points. Therefore, injection can be optimized in such a way that only the sufficient and kinetically required amount of reactant is supplied at each point and this is controlled to respond to the spatial variation of the reaction conditions (i.e., temperature, pressure and reaction mixture composition).

According to another embodiment, an intermediate or co-feed may be injected which enhances catalyst performance or suppresses a certain poisoning effect. This provides yet another utility of the present invention.

The benefits achievable by using the present invention include the accurate control of the temperature profile along the catalyst bed by controlling the reaction extent and heat release via the quantitative and positional control of reactant addition.

The invention also enhances the catalyst productivity by introducing reactants in proportions which are not possible in conventional reactors due to the explosion regime limitation and the reaction runaway limitation.

The invention also provides a tool for designing the reaction in such a way that the production of the desired product is optimized.

The invention also allows for the adjustment of the reactant mixture composition at every point inside the reactor, as well as the reactor entrance, so that reactant mixtures within the explosion regimes can be avoided.

Furthermore, the invention improves catalyst performance by the delayed addition of a component which reverts its reduction/oxidation state or a component which remedies a catalyst poisoning situation.

BRIEF DESCRIPTION OF THE FIGURES

The following detailed description, given by way of example but not intended to limit the invention solely to the specific embodiments described, may best be understood in conjunction with the accompanying drawings in which.

DESCRIPTION OF THE PREFERRED EMBODIMENTS

One aspect of the invention relates to improved continuous flow reaction systems.

Figure 1:
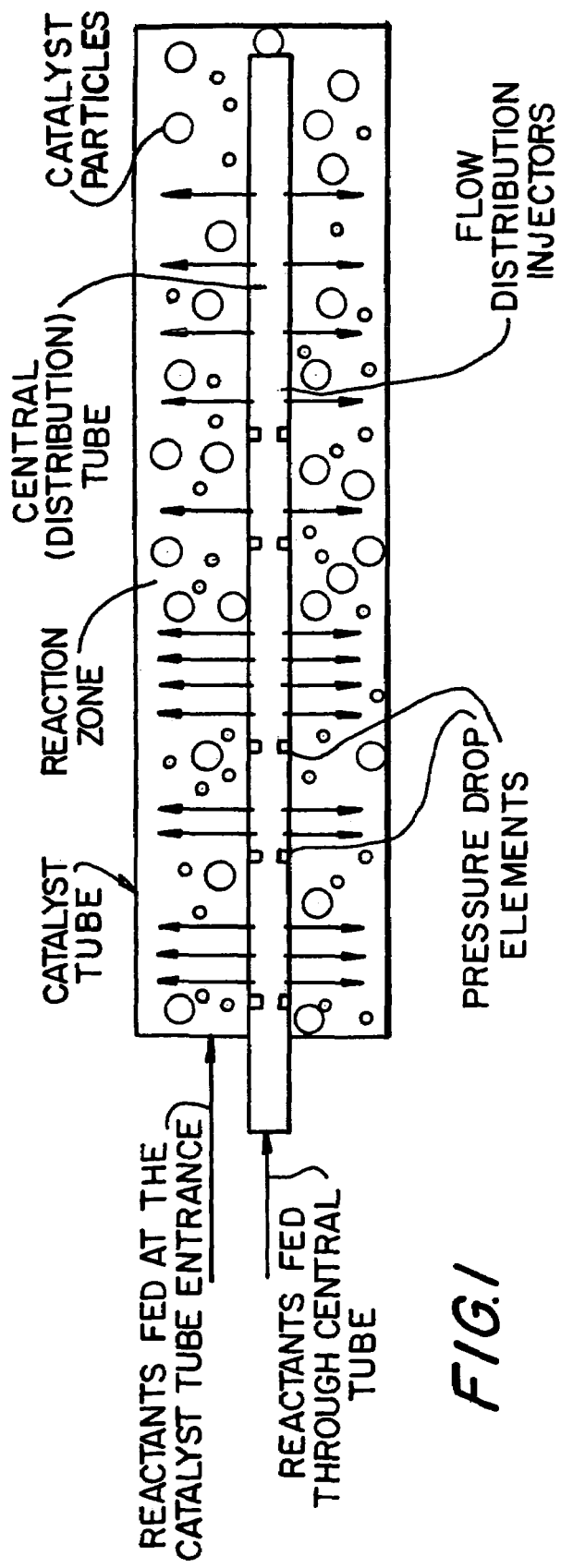
FIG. 1 is a schematical representation of an improved reaction zone according to one embodiment of the invention.

One preferred embodiment of the invention relates to multi-tubular fixed bed catalytic reactors with the novel feature of a non-uniform distribution member such as the one described in FIG. 1. The first reactant feed is fed into a reaction zone via an inlet at one end of the reaction zone, while the second reactant feed is introduced into the reaction zone at a multiplicity of points along the length of the reaction zone via a central tube or distribution member. The distribution member preferably satisfies two important criteria at each point along the length of the catalyst bed: (1) pressure drop control; and (2) flow control.

Figure 2:
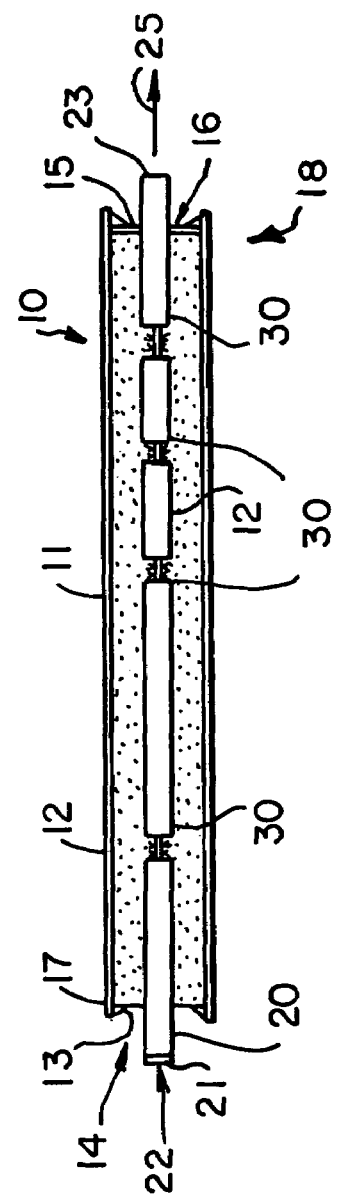
FIG. 2 is a schematical representation of an improved reaction zone according to another embodiment of the invention.

Another embodiment of the invention is depicted in FIG. 2 which shows a continuous flow chemical reaction apparatus 10 comprising a reaction zone 11, preferably a tubular reaction which optionally contains catalyst 12. Reaction zone 11 also having a length and having a first fluid reactant feed inlet 13 for introducing first fluid reactant feed 14 into tubular reaction zone 11 at a first end 17 and a product outlet 15 for product stream 16 at a second end 18. The first fluid reactant feed 14 comprises the first fluid reactant and, preferably, a portion of second fluid reactant. The tubular reaction zone 11 also includes an interior conduit 20 extending lengthwise within tubular reaction zone 10. Conduit 20 having a second feed inlet 21 for introducing a second fluid reactant feed (e.g., containing a second fluid reactant) into tubular reaction zone 11 and, optionally, a second fluid feed outlet 23 for second fluid reactant exit stream 25. Conduit 20 also having a multiplicity of injectors 30 spaced apart along the length of conduit 20, each of injectors 30 capable of introducing a controlled amount of a second fluid feed into tubular reaction zone 1. As shown in FIG. 2, conduit 20 may pass through the entire length of tubular reaction zone 1. Alternatively, conduit 20 may end within tubular reaction zone 1 (see FIG. 3 described below).

According to one embodiment, the second fluid reactant is advantageously mixed with the first fluid reactant in the first fluid feed 14 so that an injector 30 is not required in the first segment of reaction zone 1. The composition containing the second reactant provided in the first fluid feed may be the same or different from the composition containing the second reactant provided by the second feed. For example, the first feed may include pure oxygen (which is an oxygen-containing composition) as the second reactant and the second feed may contain air (which is also an oxygen-containing composition) also as the second reactant. Alternatively, the first and second feed may contain the same second reactant composition such as each containing air or pure oxygen.

According to another embodiment, first fluid reactant feed 14 includes the first reactant (without any second reactant) and second fluid reactant feed 22 includes the second reactant. According to this embodiment, the apparatus preferably includes an injector 30 proximate the first end 17 of the reaction zone 1 to provide second reactant at the front end of the reaction zone.

Figure 3:
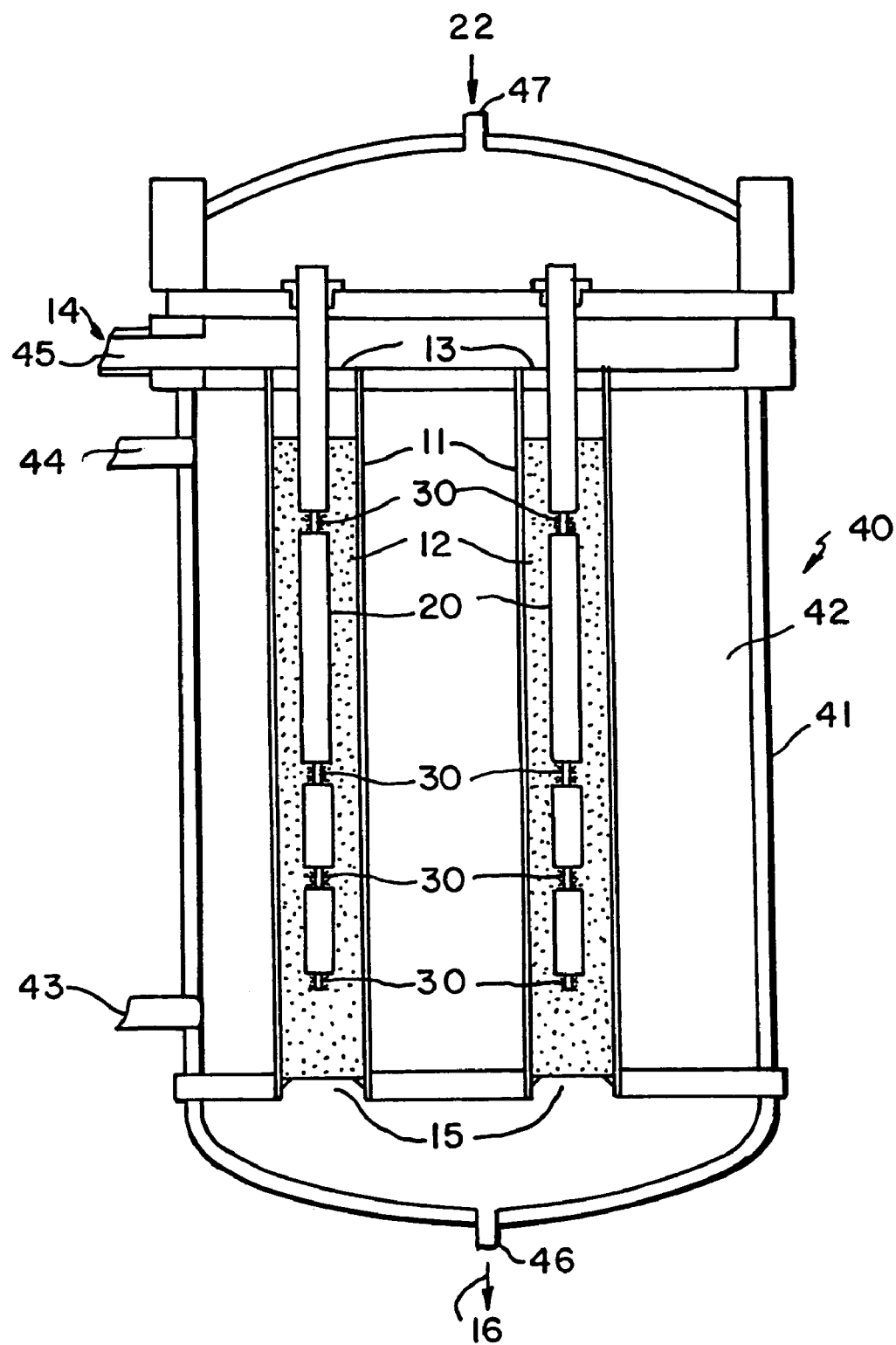
FIG. 3 is a schematical drawing of a reaction system according to one embodiment of the invention.

Yet another embodiment of the invention, depicted in FIG. 3, relates to a continuous flow chemical reaction apparatus 40 comprising a plurality of tubular reaction zones 1, optionally containing catalyst 12, within a heat transfer vessel 41 including at least one heat transfer zone 42, each of the heat transfer zones 42 having a heat transfer fluid inlet 43 and a heat transfer fluid outlet 44. Reactor apparatus 40 also having a first reaction feed inlet 45 for first reaction feed 14. Reactor apparatus 40 also having a second reaction feed inlet 47 for a second reaction feed 22 and a reactor product outlet 46 for product stream 16. According to one embodiment, first reaction feed 14 contains a first reactant (e.g., ethane, ethylene) and preferably a portion of a second reactant (e.g., air, oxygen). Each of tubular reaction zones 11 having a length, a first fluid reactant feed inlet 13 at a first end, a product outlet 15 at a second end and an interior conduit 20 extending lengthwise within tubular reaction zone 11. Interior conduits 20 having a multiplicity of injectors 30 spaced apart along the length of the conduits 20 and along the length of the tubular reaction zone 11 and each of injectors 30 being adapted to introduce a controlled amount of second fluid reaction feed 22 into tubular reaction zones 11.

Figure 4:
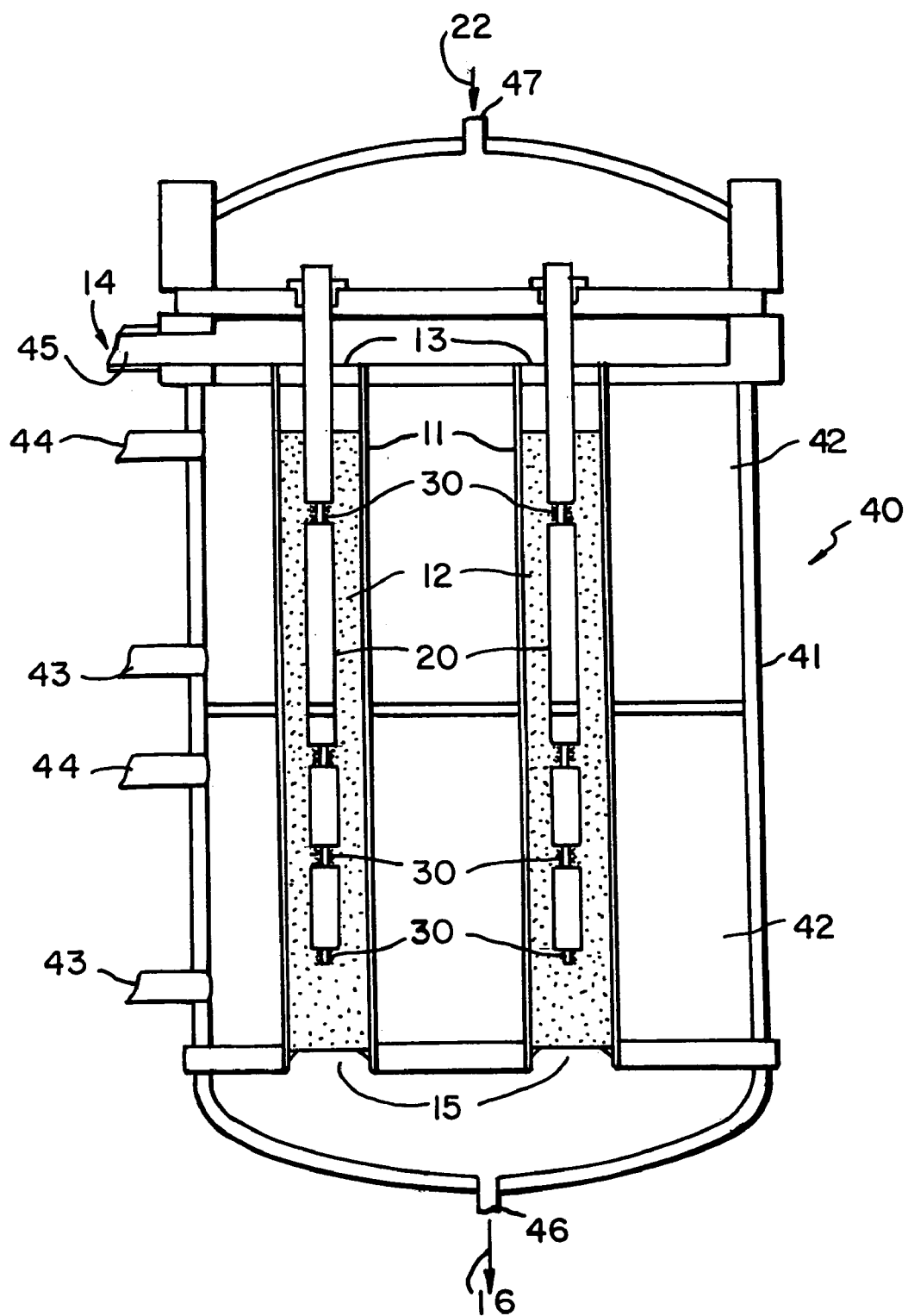
FIG. 4 is a schematical drawing of a reaction system according to another embodiment of the invention.

Preferably, as depicted in FIG. 4, heat transfer vessel 41 comprises a plurality of heat transfer zones 42. According to one preferred embodiment, heat transfer vessel 41 is a cylindrical vessel.

Figure 5:
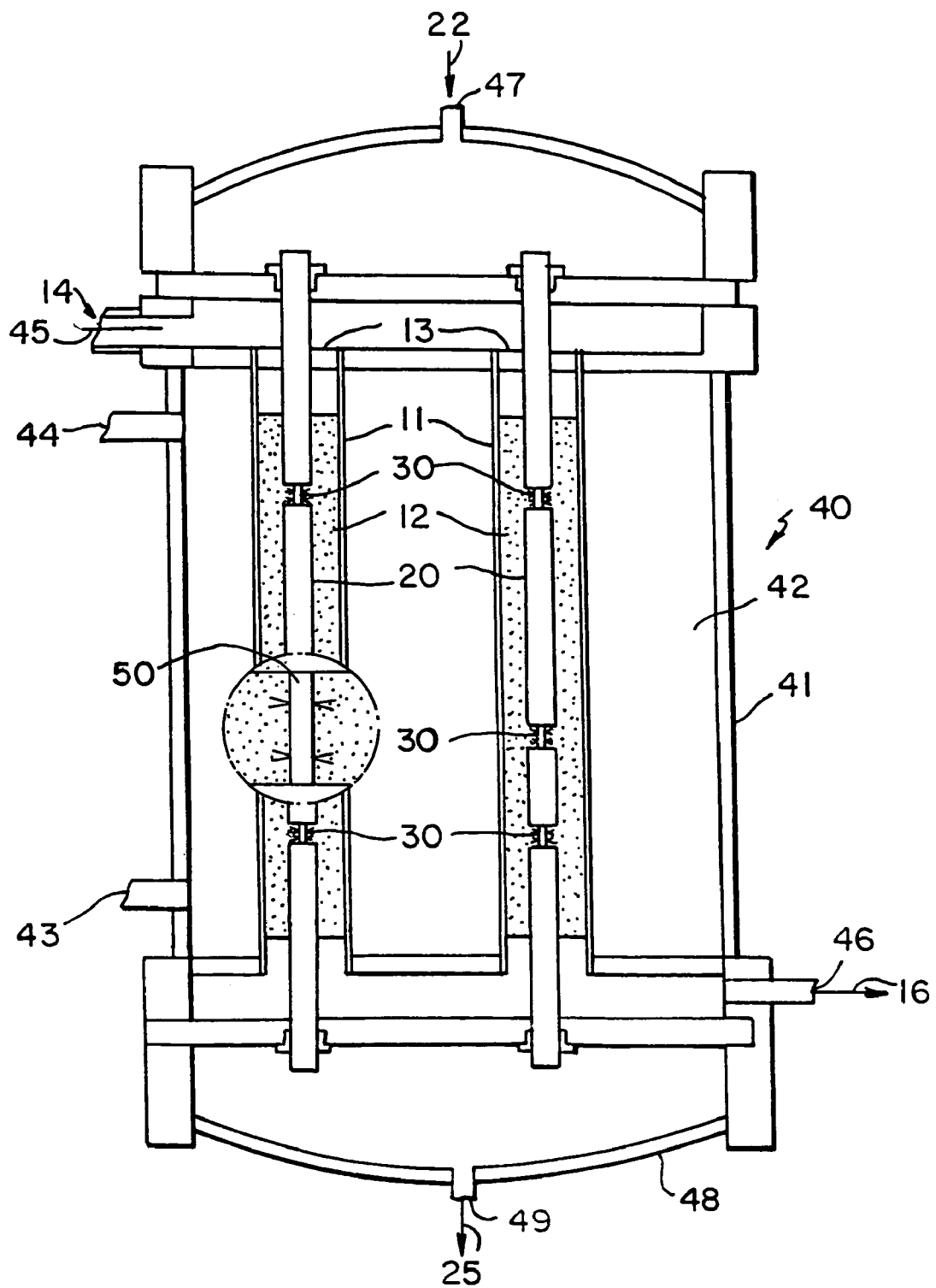
FIG. 5 is a schematical drawing of a reaction system according to yet another embodiment of the invention.

In another preferred embodiment, depicted in FIG. 5, the continuous flow chemical reaction apparatus 40 of FIG. 3 has interior conduits 20 which do not dead end in tubular reactor zone 11 but rather extend through tubular reaction zone 11 to outlet header 48 to exit the reaction apparatus 40 through second reactant feed outlet 49. In this embodiment of the invention, second feed exit stream 25 (containing excess, unreacted second reactant) can be passed through reaction apparatus 40 and thereby assist in removing the heat of reaction. Preferably, second feed exit stream 25 is recycled into reaction zone 11 via inlet 47.

Preferably, the apparatus further comprises a catalyst 12 within the tubular reaction zone(s) 11. Advantageously, the apparatus further comprises a catalyst bed(s) within the tubular reaction zone(s) and surrounding the interior conduit(s).

According to one preferred embodiment, interior conduit(s) 20 is concentric with the tubular reaction zone(s) 11. Preferably, the tubular reaction zone(s) 11 has a cross-section which is a substantially circular, interior conduit 20 is concentric with tubular reaction zone 11 and tubular reaction zone 11 comprises a catalyst bed 12 surrounding the interior conduit 20.

The apparatus of the invention comprises a plurality of injectors 30, preferably between 2 and 40 injectors, more preferably between 4 and 25 injectors and most preferred between 6 and 15 injectors. Advantageously, injectors 30 are selected from the group consisting of wall penetrations, holes, perforations, spargers, or combinations thereof.

Figure 6:
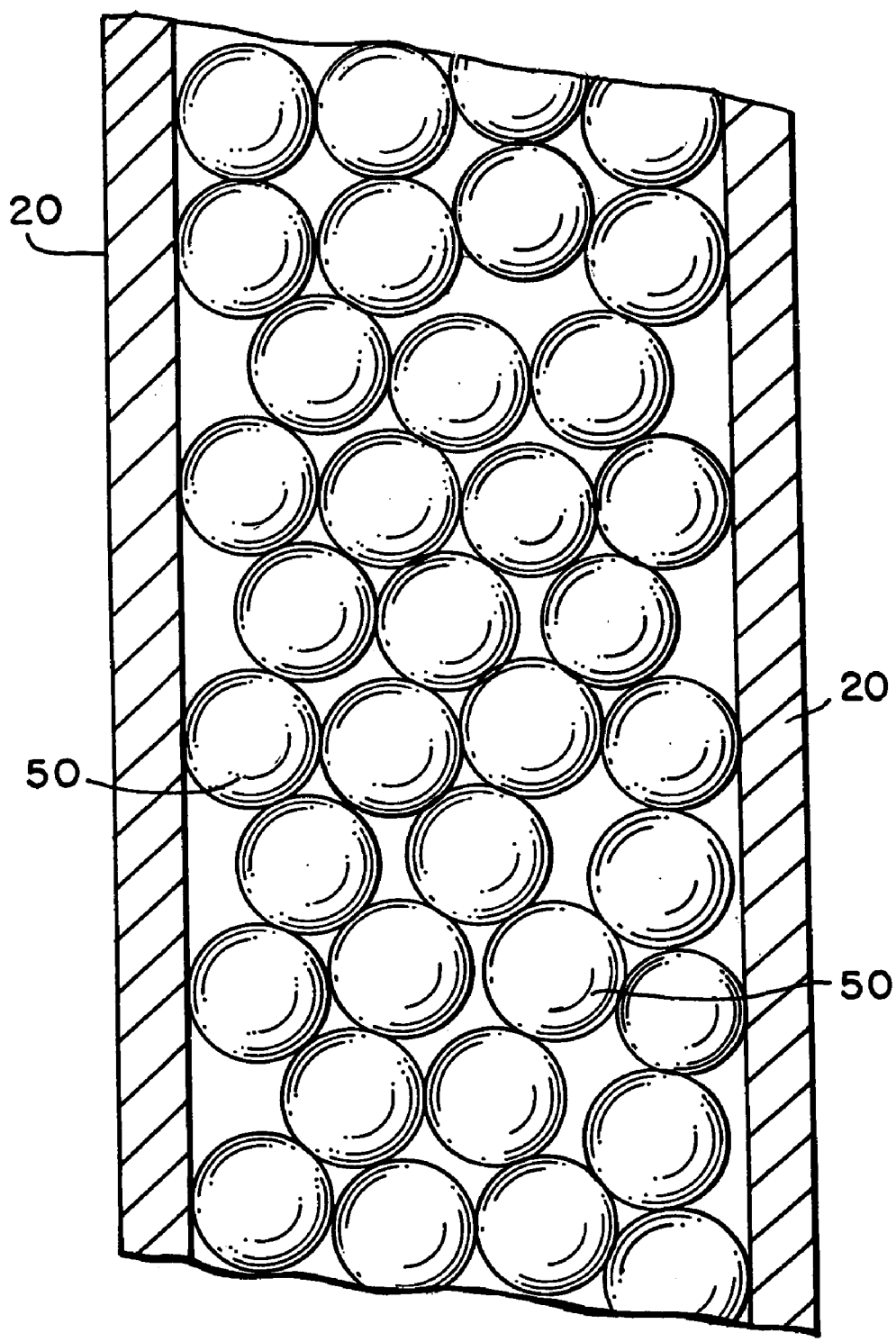
FIG. 6 is an enlarged schematical drawing of the pressure drop control means shown in FIG. 5.

According to another preferred embodiment, also depicted in FIG. 5, the apparatus further comprises a pressure drop control means 50 in conduit(s) 20 proximate to at least one of or each of injectors 30. Pressure drop control means 50 can be packing, pellets or any other flow restricting devices. FIG. 6 illustrates an enlarged schematical representation of a pressure drop control means 50 (pellets) according to one embodiment of the invention.

Figure 7:
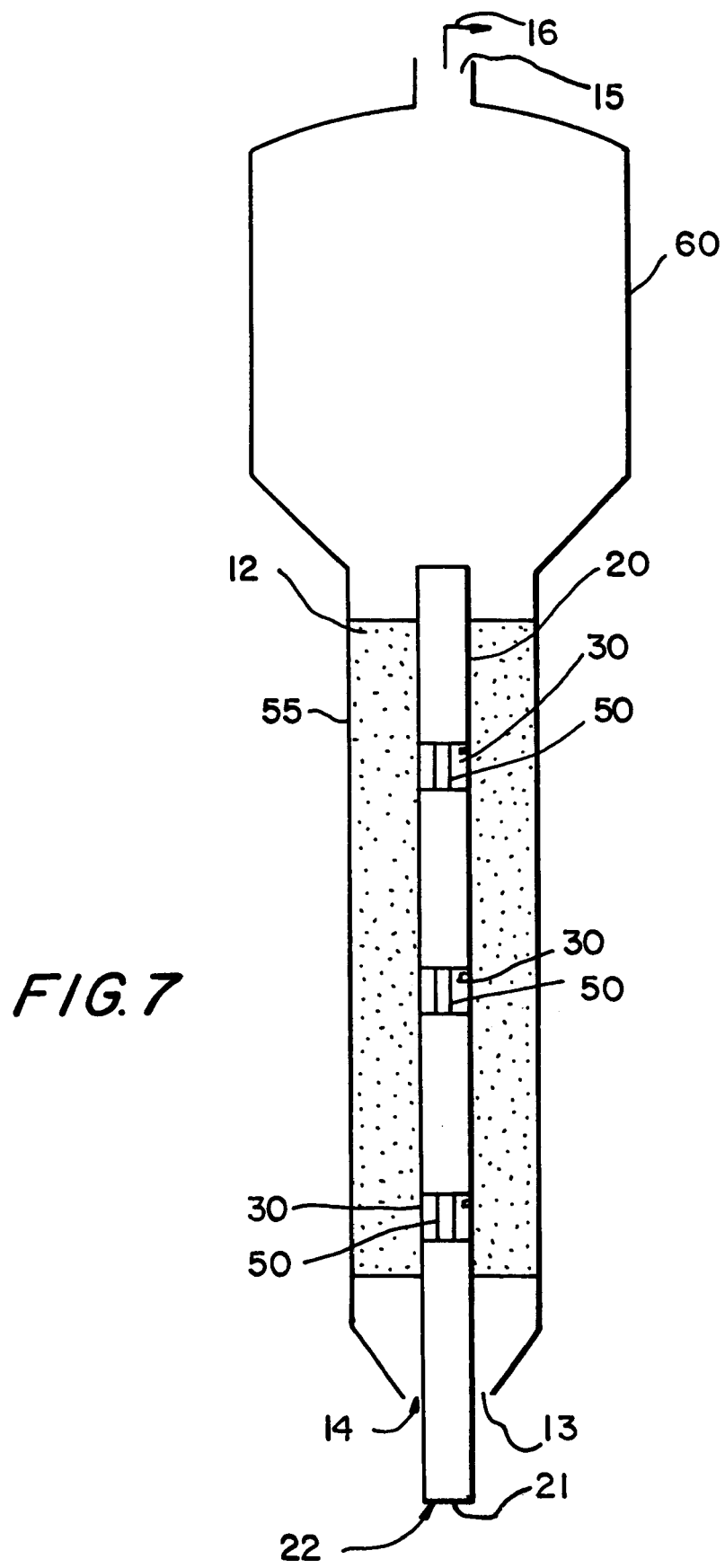
FIG. 7 is a schematical drawing of a reaction system according to another embodiment of the invention.

Another embodiment of the invention relates to a continuous flow chemical reaction fluidized bed apparatus 60 as shown in FIG. 7. Apparatus 60 comprises a fluidized bed reaction zone 55 having a height and having a first fluid reaction feed inlet 13 at a lower end for first fluid reaction feed 14 and a product outlet 15 for product stream 16 at an upper end. The first fluid reaction feed 14 includes a first reactant and preferably a portion of second fluid reactant. Fluidized bed reaction zone 55 also includes an interior conduit 20 extending vertically within the fluidized bed reaction zone 55, the conduit 20 having a multiplicity of injectors 30 spaced apart along the length of the conduit, each of the injectors 30 capable of introducing a controlled amount of a second fluid reaction feed 22 into the fluidized bed reaction zone 55. Preferably, conduit 20 also includes pressure drop control means 50 proximate injectors 30. Second fluid reaction feed 22 preferably comprises a second reactant.

Figure 8:
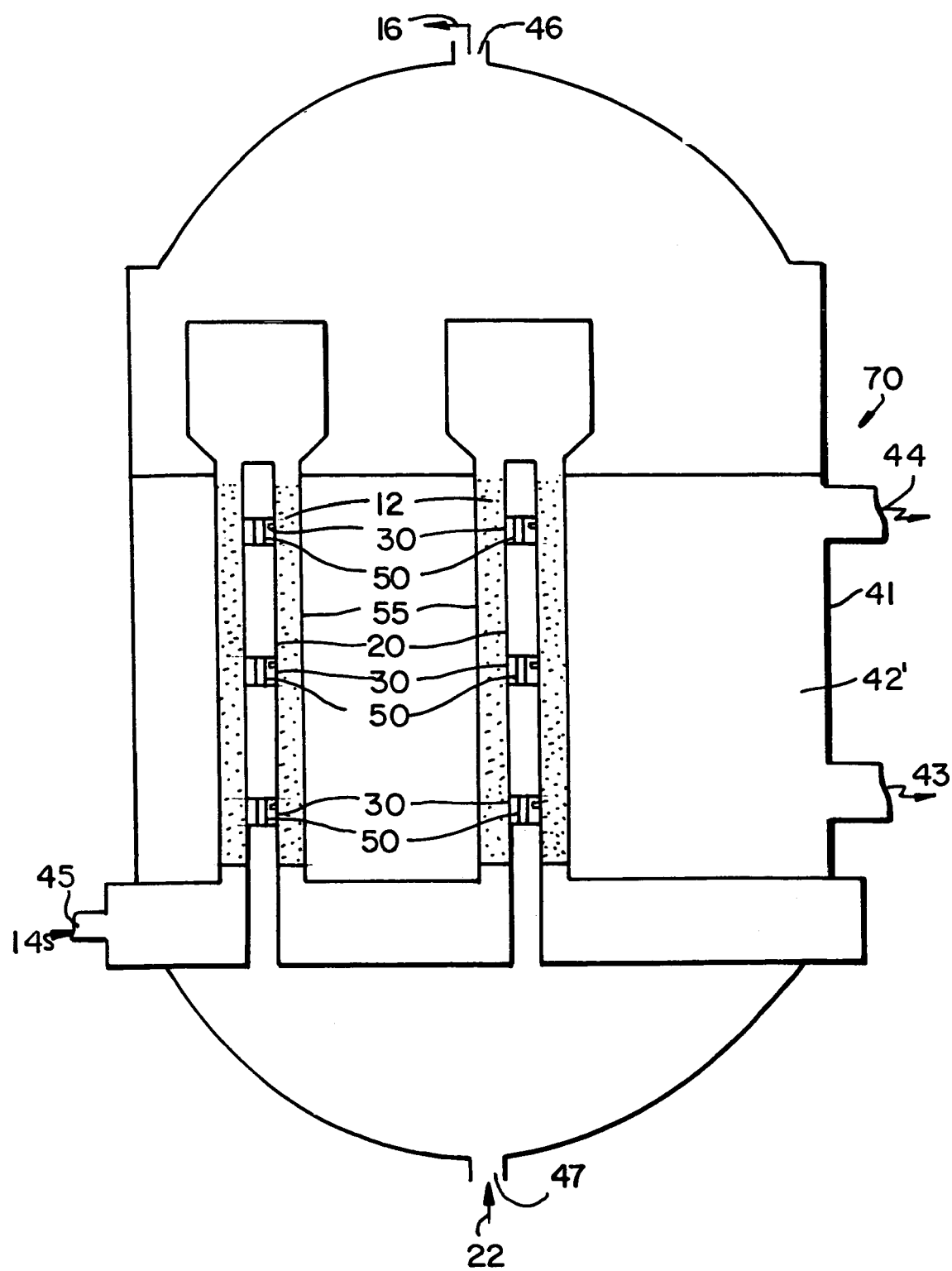
FIG. 8 is a schematical drawing of a reaction system according to yet another embodiment of the invention.

Yet another embodiment of the invention, shown in FIG. 8, relates to a continuous flow chemical reaction apparatus 70 comprising a plurality of fluidized bed reaction zones 55 within a heat transfer vessel 41 having at least one heat transfer zone 42, each of the heat transfer zones 42 having a heat transfer fluid inlet 43 and a heat transfer fluid outlet 44 and each of the tubular reaction zones 55 having a height. The tubular reaction zones 55 also having a first fluid feed inlet 45 for first fluid feed 14 at a lower end, a product feed outlet 46 for product feed 16 at an upper end and an interior conduit 20 extending vertically within each of fluidized bed reaction zones 55. The interior conduits 20 having a multiplicity of injectors 30 spaced apart along the length of the fluidized bed reaction zones 55 and each of the injectors 30 being adapted to introduce a controlled amount of a portion of second fluid feed reactant 22 into the fluidized bed reaction zone 55.

Figure 9:
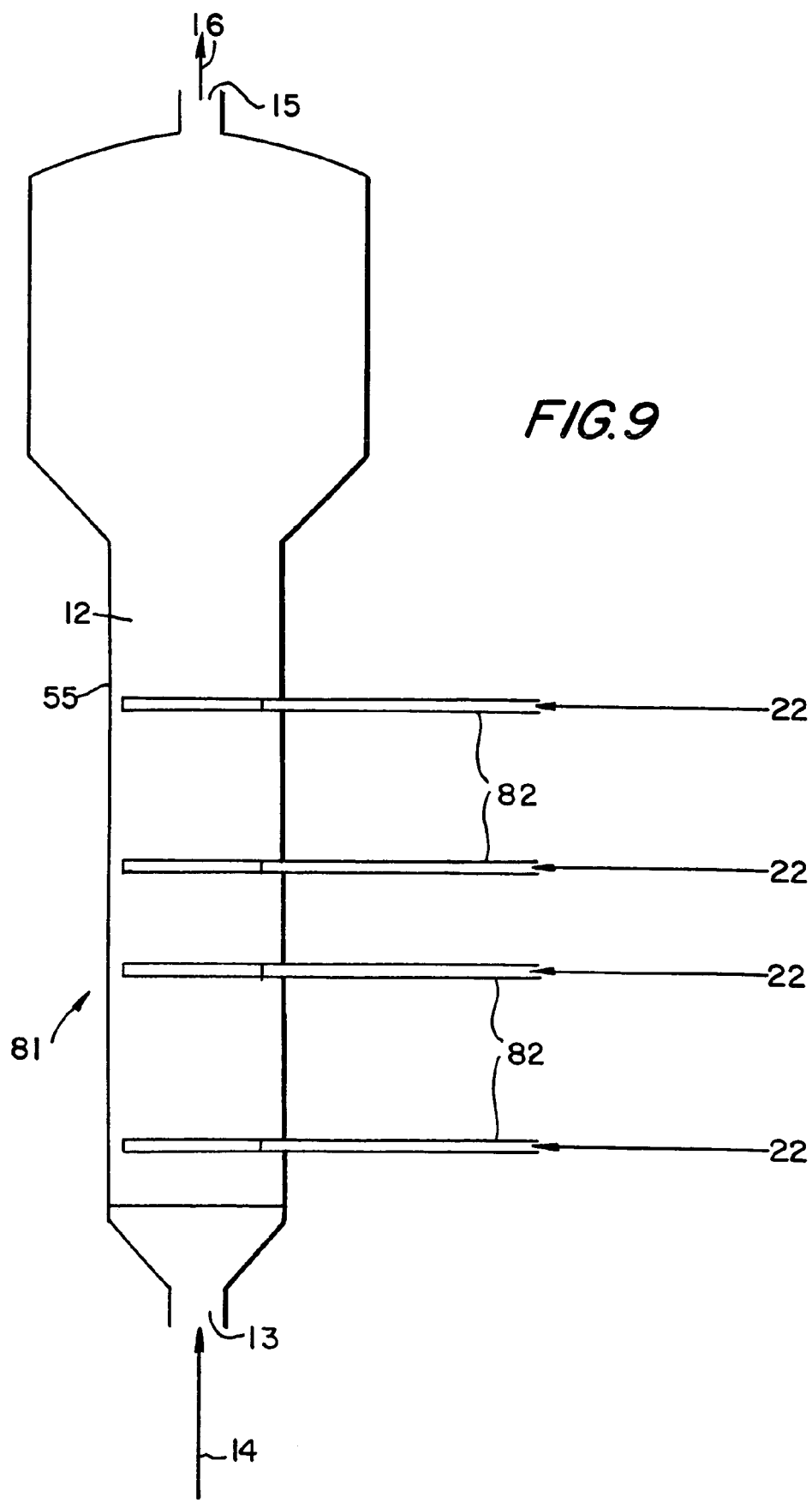
FIG. 9 is a schematical drawing of a reaction system according to another embodiment of the invention.

FIG. 9 illustrates a partial schematical view of another embodiment of the invention where apparatus where second reactant feed 22 is introduced into a fluidized bed reaction zone 81 via conduits 82, wherein the conduits 82 are perpendicular to the flow of first reaction feed 14 and each conduit 82 introduces different or the same amounts of second reaction feed 22 at each point along reaction zone 81.

Preferably, the fluidized bed apparatus is capable of operating in the bubbling regime. According to one embodiment, the reaction zone is a circulating fluidized bed.

Another aspect of the invention relates to improved chemical reactions. Using the present invention, chemical reactions can be performed achieving improved yields and selectivity. The fluid flowing through the distribution member can be a single reactant component, a mixture of reacting components or a mixture of reacting component(s) and inert component(s).

One embodiment of the invention relates to a method of performing a continuous chemical reaction between at least one first fluid reactant and at least one second fluid reactant to form a reaction product comprising:

(a) continuously introducing a first fluid reaction feed containing the first reactant and, preferably, the second fluid reactant, into a first end of a tubular reaction zone having a length whereby the first and second fluid reactants continuously flow towards a second end of the tubular reaction zone; and (b) continuously introducing a second fluid reaction feed containing the second fluid phase reactant into an interior conduit which extends lengthwise within the tubular reaction zone, the interior conduit having a multiplicity of injectors spaced apart lengthwise along the conduit;

(c) introducing the second fluid reaction feed into the tubular reaction zone at a multiplicity of points along the length of the tubular reaction zone by passing controlled amounts of the second reaction feed containing the second reactant through the multiplicity of injectors into the tubular reaction zone; and (d) providing conditions conducive to the chemical reaction in the tubular reaction zone whereby the chemical reaction proceeds and the reaction product is formed.

Another embodiment of the invention relates to a method of performing a catalytic chemical reaction comprising reacting a first fluid reactant with a second fluid reactant to form a reaction product in a catalyst bed, wherein (a) a first fluid reaction feed is introduced into a first end of a tubular reaction zone having a length and containing the catalyst bed, the first fluid reaction feed containing the first and second fluid reactants flowing towards a second end of the tubular reaction zone;

(b) a second fluid reaction feed containing the second reactant is introduced into a conduit within and concentric to the tubular reaction zone, the conduit having a multiplicity of injectors spaced apart lengthwise along it and each of the injectors introduces a controlled amount of the second reactant into the tubular reaction zone; and (c) providing conditions conducive to the chemical reaction within the tubular reaction zone whereby the chemical reaction proceeds and the reaction product is formed.

Preferably, the tubular reaction zone(s) contains a catalyst and the first fluid reactant flows through the catalyst along with the second fluid reactant.

According to one preferred embodiment, the chemical reaction has a selected reaction temperature and the temperature in the tubular reaction zone(s) is maintained within 15° C. of the selected reaction temperature through at least 50% of the length of the tubular reaction zone(s). Preferably, the reaction temperature is maintained within 10° C., advantageously within 6° C. of the selected reaction temperature through at least 50% of the length of the tubular reaction zone(s).

According to another preferred embodiment, the chemical reaction has an explosive regime when the concentration of the second fluid reactant in the tubular reaction zone is at an explosive concentration and the invention further comprises controlling the amount of the second fluid reactant introduced into the tubular reaction zone so that the concentration of the second fluid reactant is at least 70%, preferably at least 80%, more preferably at least 90%, of the explosive concentration through at least 50% of the length of the tubular reaction zone and does not exceed the explosive concentration at any point throughout the length of the tubular reaction zone.

According to one preferred embodiment, the total overall inventory of the reacting mixture falls within an unsafe/explosive composition region, while at any given point or region within the reactor the compositional mixture is within the domain of safe/non-explosive compositions.

According to one embodiment, the chemical reaction is the partial oxidation of ethane to ethylene and acetic acid, and wherein the first fluid reactant comprises ethane and the second fluid reactant comprises oxygen. (e.g., pure $O_2$, air, etc.).

According to another embodiment, the chemical reaction is the partial oxidation of ethane to ethylene and acetic acid, wherein the first fluid reactant comprises ethane and the second fluid reactant comprises oxygen, and at least 10% of the ethane in the first fluid reactant is reacted to form acetic acid per single pass through the tubular reaction zone.

Another embodiment of the invention relates to a method of performing a continuous chemical reaction in a fluidized bed between at least one first fluid reactant and at least one second fluid reactant to form a reaction product comprising:

(a) continuously introducing the first fluid reactant and preferably a portion of the second fluid reactant into a lower end of a fluidized bed reaction zone having a height whereby the reactant(s) continuously flows towards an upper end of the fluidized bed reaction zone; and (b) continuously introducing the second fluid phase reactant into an interior conduit which extends vertically within the fluidized bed reaction zone, the interior conduit having a multiplicity of injectors spaced apart lengthwise along the conduit;

(c) introducing the second fluid phase reactant into the first fluid phase reactant at a multiplicity of points along the height of the fluidized bed reaction zone by passing controlled amounts of the second reactant through the multiplicity of injectors into the fluidized bed reaction zone; and (d) providing conditions conducive to the chemical reaction in the fluidized bed reaction zone whereby the chemical reaction proceeds and the reaction product is formed.

Another embodiment relates to a method of performing a catalytic chemical reaction comprising reacting a first fluid reactant with a second fluid reactant to form a reaction product in a catalyst bed, wherein:

(a) the first fluid reactant, along with a portion of second fluid reactant, is introduced into a lower end of a fluidized bed reaction zone having a height and containing the catalyst bed, the first and second fluid reactants flowing towards an upper end of the fluidized bed reaction zone;

(b) the second fluid reactant is introduced into a conduit within the fluidized bed reaction zone, the conduit having a multiplicity of injectors spaced apart lengthwise along it and each of the injectors introduces a controlled amount of the second reactant into the fluidized bed reaction zone; and (c) providing conditions conducive to the chemical reaction within the fluidized bed reaction zone whereby the chemical reaction proceeds and the reaction product is formed.

Preferably, the chemical reaction in the fluidized bed proceeds in the bubbling regime.

A full range of industrially important reactions can benefit from the current inventions especially those suffering from: temperature run-away limitations and explosive mixtures composition limitation such as ethylene oxide, maleic anhydride, phalic anhydride, etc. Additional reactions which may be performed using the present invention are set forth in Table I below.

TABLE I

| Reaction | Catalyst |
|---|---|
| Hydrogenation | |
| Cyclopropane + $H_2$ $C_3H_8$ | Pt, Pd, Rh, Ru |
| $C_2H_6$ + $H_2$ 2$CH_4$ | |
| 3$H_2$ + $N_2$ 2$NH_3$ | Fe |
| 2$H_2$ + CO $CH_3$ OH | $Cu^+$/ZnO |
| Heptane toluene + 4$H_2$ | Pt |
| Acetone + $H_2$ 2-propanol | Pt, Copper chromite |
| $H_2$ + aldehyde alcohol | Pt, Pd, Rh, Ru |
| Oxi-chlorination | |
| Halogenation Oxidation | |
| $CH_3OH$ + ½$O_2$ $CH_2O$ + $H_2O$ | $Fe_2O_3 \cdot MoO_3$ |
| $H_2O$ + CO $H_2$ + $CO_2$ | $Fe_3O_4$, Ni, CuO/ZnO |
| ½$O_2$ + $CH_2$ $CH_2$ $CH_3CHO$ | PdCl and similar salts of noble metals |
| $RCH_2OH$ $RCHO$ + $H_2$ | Pt |
| Glucose d-glucuronic acid | Pt |

EXAMPLES

The invention is further described in the following examples. The examples are illustrative of some of the products and methods of making the same falling within the scope of the present invention. They are, of course, not to be considered in any way limitative of the invention. Numerous changes and modifications can be made with respect to the invention.

Example 1

Partial oxidation of ethane to ethylene and acetic acid is utilized here as a model reaction to demonstrate the benefit of the present invention. Kinetics developed by Thorstienson et al., *Journal of Catalysis*, vol. 52, pp. 116–132 (1978) are used to describe the rates of reactions involved on this partial oxidation process, those reactions are:

$C_2H_6+0.5O_2 \rightarrow C_2H_4+H_2O$
$C_2H_4+O_2 \rightarrow CH_3COOH$
$C_2H_6+3.5O_2 \rightarrow 2CO_2+3H_2O$
$C_2H_4+2O_2 \rightarrow 2CO+2H_2O$
$CH_3COOH+O_2 \rightarrow 2O+2H_2O$
$CO+0.5O_2 \rightarrow CO_2$
$C_2H_4+3.0O_2 \rightarrow 2CO_2+2H_2O$ Model equations have been developed for the catalyst tube resulting in a system of non-linear ordinary differential equations which were solved numerically to predict the non-isothermal behavior of the reaction. This is to calculate the reacting mixture compositions, pressure and temperature at each point along the length of the reactor tube.

The model was then used to simulate operating scenarios where the target in each one was to maximize the production of ethylene and acetic acid without having a oxygen concentration higher than that of the lower explosion limit of the ethane-oxygen mixture (estimated as 8% oxygen in ethane under the elected operating conditions).

Operating variables and design parameters for the three cases (Cases I, II and III) which were studied using the model are provided in Table II. The predicted performance is also given in the same table.

TABLE II

| | Case I | Case II | Case III |
|---|---|---|---|
| Ethane Flow, SLPH | 8280 | 8280 | 8280 |
| Oxygen Flow at entrance, SLPH | 720 | 720 | 720 |
| Oxygen Flow Distributed, SLPH | — | 400 | 1000 |
| Feed Temperature, C. | 120 | 120 | 120 |
| Coolant Temperature, C. | 256 | 254 | 254 |
| Feed Press, Barg. | 26 | 26 | 26 |
| Catalyst Tube ID mm | 24.3 | 24.3 | 24.3 |
| Catalyst Tube OD mm | 33.4 | 33.4 | 33.4 |
| Catalyst Tube Length, mm | 1250 | 1250 | 1250 |
| Central Tube OD, mm | — | 6 | 6 |
| Ethane conversion, % | 4.0 | 5.6 | 7.6 |
| Oxygen Conversion, % | 92.8 | 85.0 | 77.6 |
| Selectivity to (Ethylene + Acetic Acid) | 72.8 | 70.1 | 68.0 |
| Overall Performance in STY (Tons of desired products per ton Catalyst per Year) | 593 | 803 | 1058 |

In Case I, the reactor is of the conventional fixed bed type, and the feed composition is constrained by the explosion limit of 8% $O_2$ in the mixture.

The second scenario (Case II) employs a reactor of the type proposed by Tonkovich et al. (1996) in *Chem. Eng. Science*, vol. 51, in which the distribution of more oxygen than that allowed in the main feed is carried out continuously along the catalyst bed by means of a porous central tube. The amount of oxygen flowed through the central tube was limited by the oxygen concentration at intermediate points in the catalyst bed.

Figure 10:
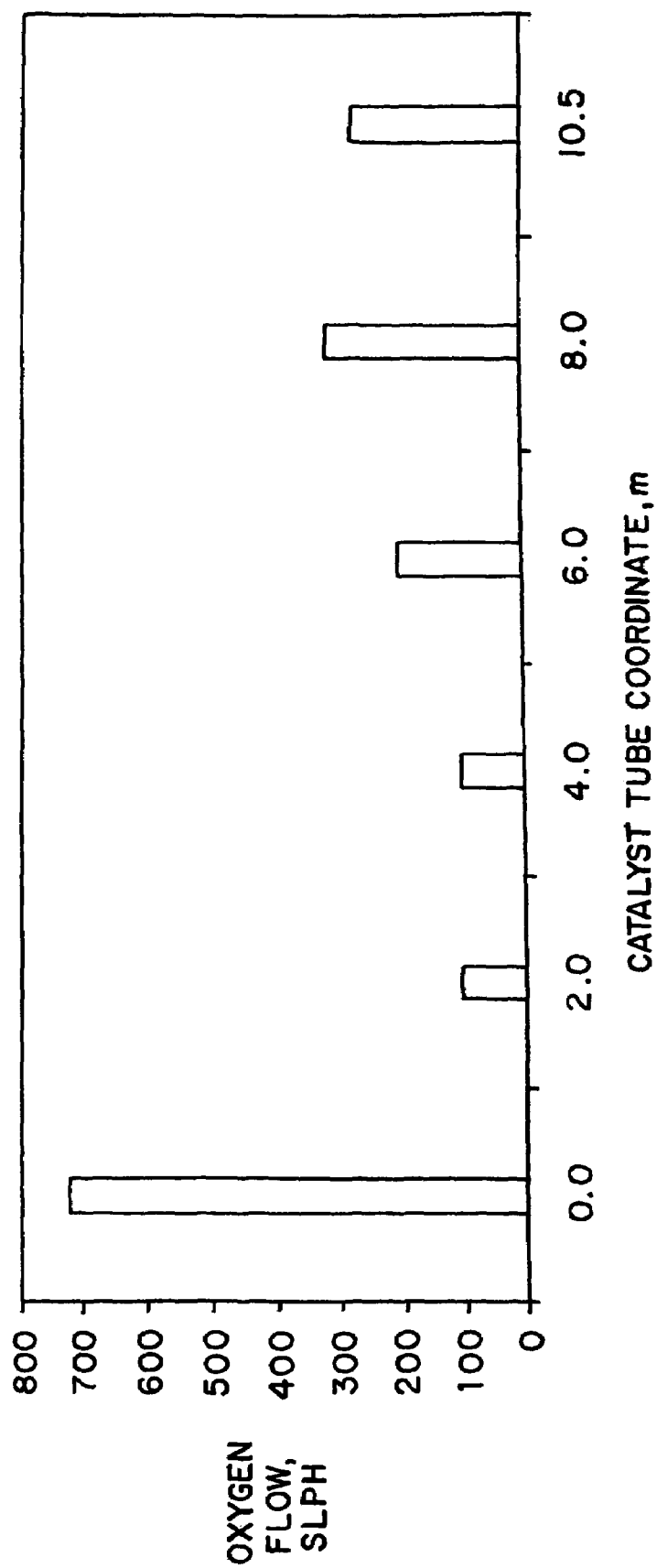
FIG. 10 is a graphical representation of the oxygen distribution pattern for a continuous flow chemical reaction zone according to one embodiment of the invention where the vertical axis represents oxygen flow (SLPH) and the horizontal axis represents the reaction tube coordinate along the length of the reaction zone (m).

The third scenario (Case III) has a special oxygen flow distribution pattern, as shown in FIG. 10. The same constraint of 8% oxygen concentration was used for this case. However, the non-uniform/controlled distribution pattern gave rise to a much superior reactor performance, as it allowed for much more oxygen to be fed to the reaction system, thus increasing the ethane conversion and the catalyst tube productivity. The preferred embodiment of the invention (Case III) provides a performance improvement of 78% over the conventional reactor and 32% over the uniform oxidant distribution option (Case II).

Figure 11:
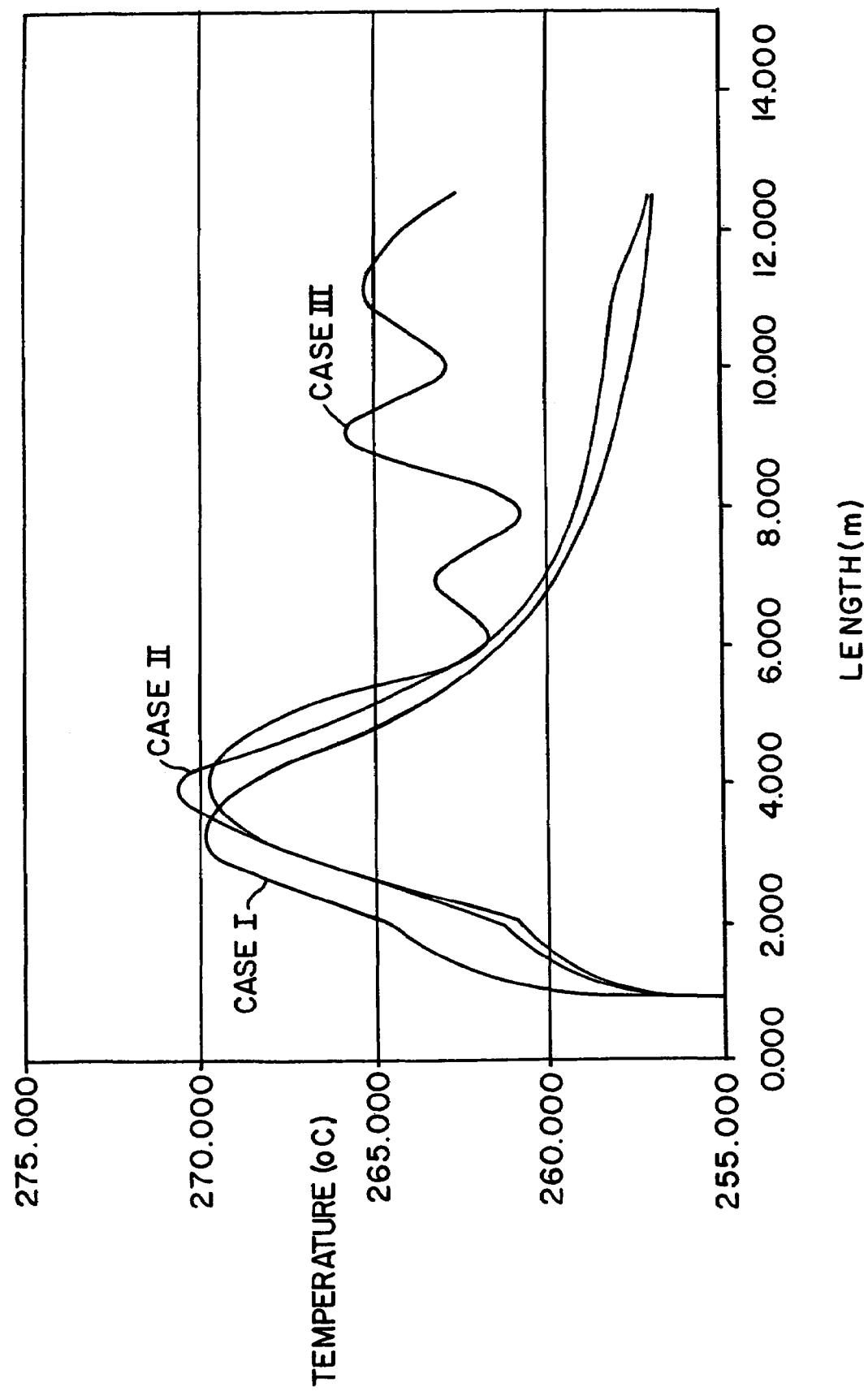
FIG. 11 is a graphical representation of the reaction temperature profile for a continuous flow chemical reaction zone according to one embodiment of the invention and according to two comparative continuous flow chemical reaction zones where the vertical axis represents reaction temperature (° C.) and the horizontal axis represents the reaction tube coordinate along the length of the reaction zone (m).

Moreover, the invention provides for better control over the catalyst bed temperature as shown in FIG. 11, maintaining the catalyst and reaction mixture in a preferred operating temperature range, while this advantage was not achievable neither by conventional reactor nor by the uniform distribution option.

Figure 12:
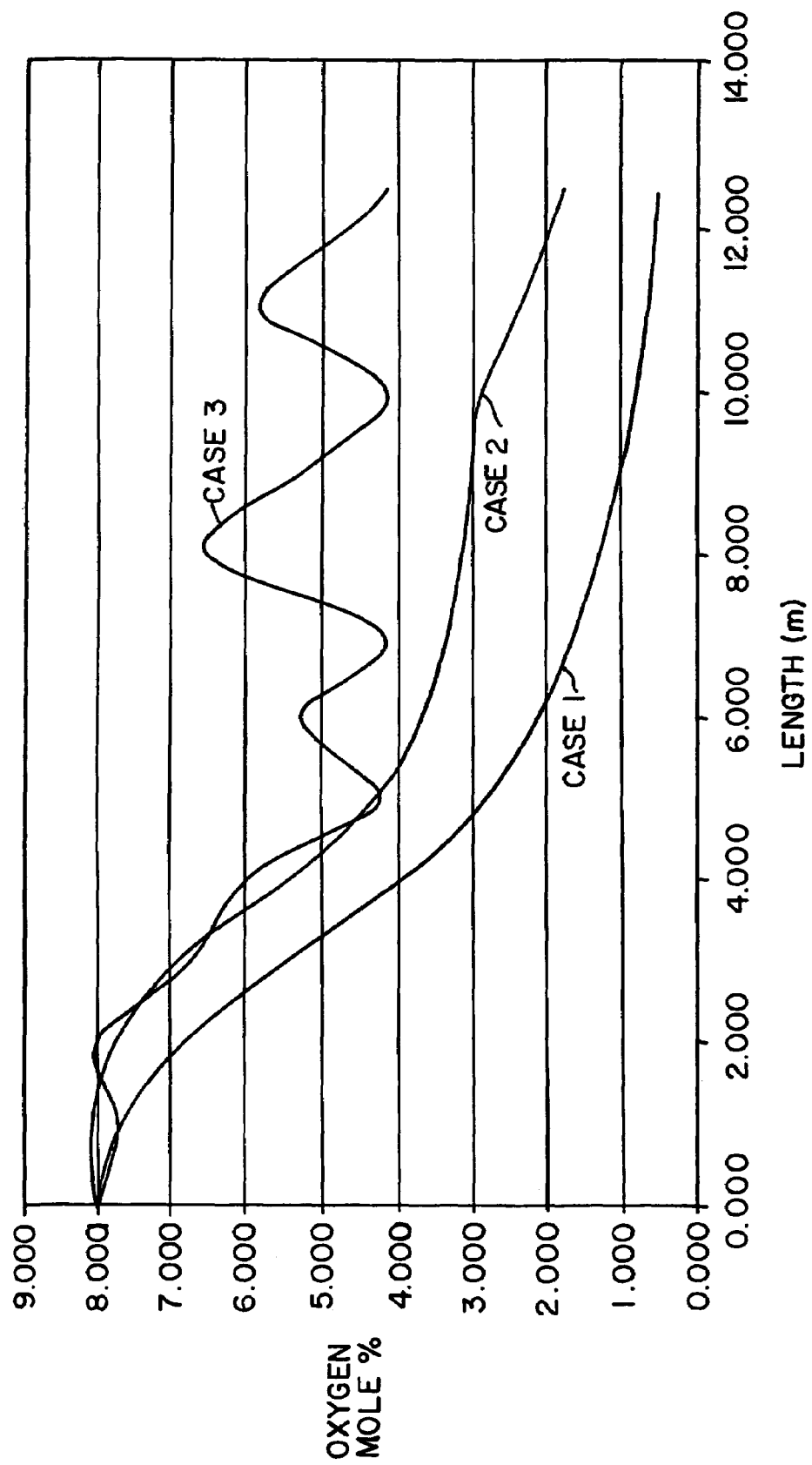
FIG. 12 is a graphical representation of the oxygen concentration profile for a continuous flow chemical reaction zone according to one embodiment of the invention and according to two comparative continuous flow chemical reaction zones where the vertical axis represents oxygen concentration (mole %) and the horizontal axis represents the reaction tube coordinate along the length of the reaction zone (m).

Another reason for the superior performance demonstrated is the ability of the novel reactor to maintain the oxygen concentration within a favorable range along the length of the reaction zone, as can be seen in FIG. 12.

Example 2

Figure 13:
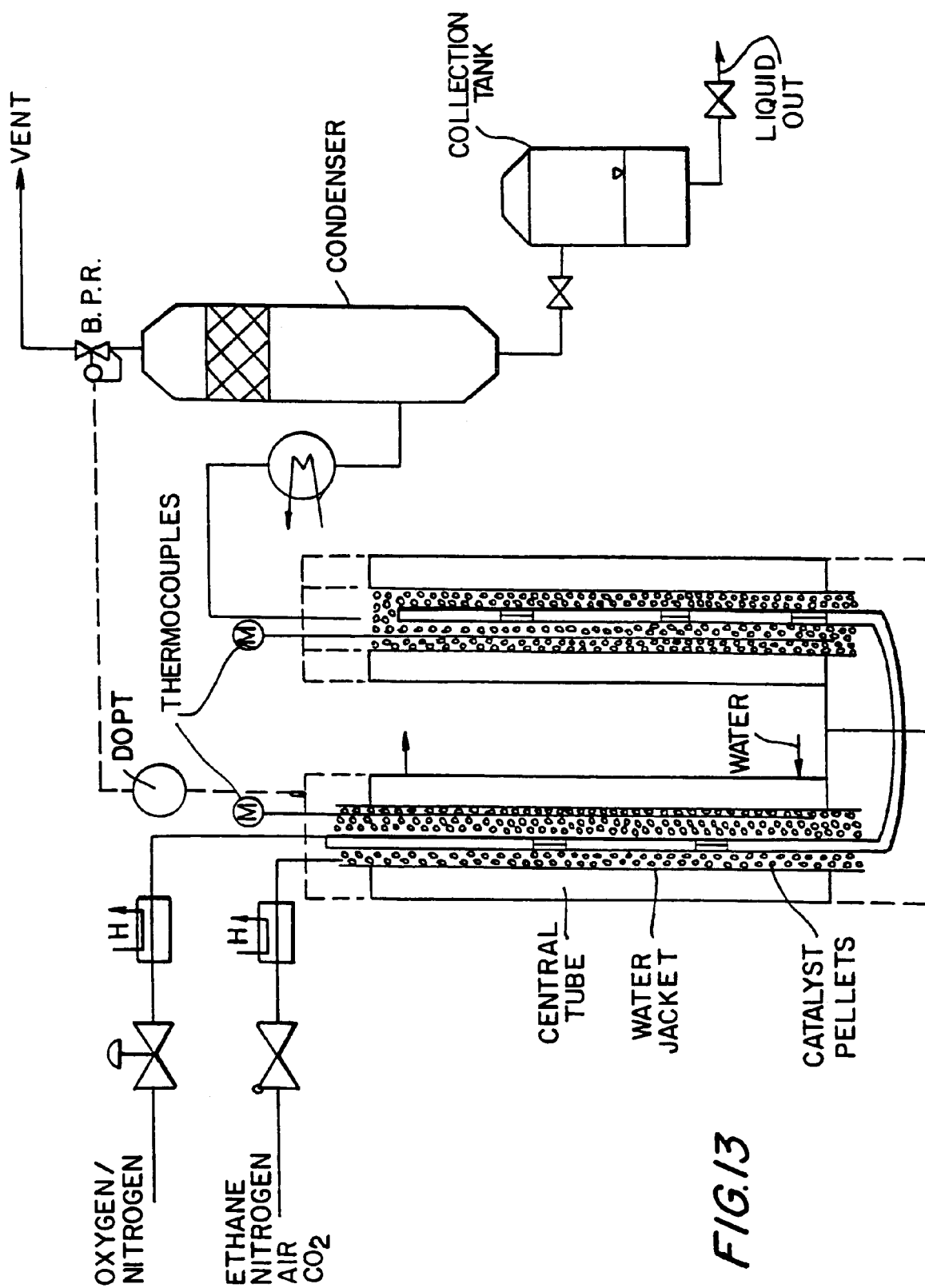
FIG. 13 is a schematical drawing of a reaction system according to another embodiment of the invention.

The reaction of ethane oxidation was performed using a pilot scale testing unit illustrated in FIG. 13. The following is a description of the testing rig:

A. Feed Section

The feed section consisted mainly of clusters of compressed gas cylinders with manifolds and mass flow controllers. The feed section was constructed to feed into the reactor the following reactants: ethane, air, oxygen, carbon dioxide and nitrogen. Mass flow controllers on each gas feed line were operated from a remote location. A forward pressure regulator on each gas feed line maintained the desired pressure of the reactants.

B. Reactor Section

The prototype multi-injection reactor was constructed from 316 stainless steel with a length of 12.5 m. It was bent into a U-shape to keep the structure within a reasonable height. The reactor consisted of an inner (distribution) tube, a thermowell, an outer tube and a shell. The inner tube and the thermowell were situated inside the outer tube, which was filled with a catalyst of the type described in the U.S. Pat. No. 6,030,920, U.S. Pat. No. 6,013,597 and U.S. Pat. No. 5,907,056. The shell surrounded the outer tube. The dimensions of the tubes and the shell are as follows:

|  | Outer diameter, mm | Thickness, mm |
| --- | --- | --- |
| Inner tube | 12 | 1.5 |
| Thermowell | 8 | 1.5 |
| Outer tube | 44.5 | 2.6 |
| Shell | 88.9 | 4.0 |

The inner tube had distribution points along its length equipped with custom-built injectors. The size and number of injector holes were designed to provide the following flow pattern:

| Location from tube entrance, mm | 2000 | 4000 | 6000 | 8000 | 10500 |
| --- | --- | --- | --- | --- | --- |
| Percentage of the total flow to the inner tube | 8 | 11 | 30 | 28 | 23 |

Steam was circulated in the shell of the reactor counter currently to accomplish the required heat removal. A differential pressure transmitter ("DPT") was installed to monitor the total pressure drop along the reactor catalyst bed. A provision for sampling the reaction mixture was made at four different points along the catalyst bed.

C. Product Handling

The product gases from the reactor were then transferred to a shell and tube heat exchanger, where product condensation was achieved by a chilled water being circulated on the shell side. The two phase flow exiting the exchanger was sent to a gas liquid separator, from which gases were vented and liquids were collected in a receiving tank. Both condensation and separation of the product took place under the system pressure by means of a back pressure regulator installed on the vent gas line leaving the condensate separator.

D. Heat Transfer System

The heat transfer system included a steam drum and an air blower. The steam drum was located at a point above the reactor and was connected to the shell side of the reactor. The air blower was connected to the jacket of the drum to cool the steam. The system was instrumented with a level transmitter to indicate the level of water in the drum, a temperature transmitter, a pressure transmitter and safety relief valve.

E. Results

A comparison is given below in Table III for two experimental runs, where in the first run the oxygen feed was introduced according to the distribution scheme given earlier. While in the second run the inner tube was replaced by a dummy tube and only the allowable oxygen due to the explosion limit was introduced with the hydrocarbon at the reactor entrance (e.g., single oxygen inlet with hydrocarbon feed). All other conditions (coolant temperature, reaction peak temperature, hydrocarbon flow, system pressure, etc.) were kept the same.

TABLE III

|  | Run #1 | Run #2 |
| --- | --- | --- |
| Total flow, m$^3$/h | 33.28 | 33.3 |
| Percentage ethane | 44.95 | 45.05 |
| Oxygen injected | 3.3 | 0.0 |
| Pressure, barg | 26.0 | 26.0 |
| Coolant Temperature, C. | 251.0 | 251.0 |
| Peak Temperature, C. | 278.0 | 278.0 |
| Ethane conversion, % | 13.02 | 8.69 |
| Oxygen Outlet, % | 5.51 | 0.52 |
| Acetic Acid Selectivity, % | 59.24 | 48.12 |
| Ethylene Selectivity, % | 16.38 | 25.38 |
| $CO_2$ Selectivity, % | 23.34 | 25.74 |
| Acetic Acid Productivity, kg Acid/kg Catalyst/year | 1171.7 | 636.9 |

As shown in Table III, the present invention (Run #1) provides a productivity to acetic acid at least 80% greater than the productivity provided by the comparative embodiment (Run #2). Moreover, both the ethane conversion and acetic acid selectivity is improved using the invention.

Reference is also made to copending U.S. application Ser. No. 09/565,355 by Adris et al. and entitled "Tubular Reactor with Gas Injector For Gas Phase Catalytic Reactions" filed on even date herewith, herein incorporated by reference.

The above description of the invention is intended to illustrative and not limiting. Various changes or modifications in the embodiments described may occur to those skilled in the art. These can be made without departing from the spirit or scope of the invention.

What is claimed is:

1. A continuous flow chemical reaction apparatus comprising a tubular reaction zone having a length and having a first fluid feed inlet at a first end and a product outlet at a second end, said tubular reaction zone having an interior conduit extending lengthwise within said tubular reaction zone, said conduit having a second fluid feed inlet and a multiplicity of injectors spaced apart along the length of said conduit, each of said injectors capable of introducing a controlled amount of a second fluid reactant into said tubular reaction zone, and at least one of said injectors having a pressure drop control means in said conduit proximate to said injector.

2. The chemical reaction apparatus of claim 1, further comprising a catalyst within the tubular reaction zone.

3. A continuous flow chemical reaction apparatus comprising a plurality of tubular reaction zones within a heat transfer vessel having at least one heat transfer zone, each of said heat transfer zones having a heat transfer fluid inlet and a heat transfer fluid outlet, each of said tubular reaction zones having a length, a first fluid feed inlet at a first end, a product outlet at a second end and an interior conduit extending lengthwise within said tubular reaction zone, said interior conduit having a second fluid feed inlet and a multiplicity of injectors spaced apart along the length of said tubular reaction zone and each of said injectors being adapted to introduce a controlled amount of a second fluid reactant into said tubular reaction zone, and at least one of said injectors having a pressure drop control means in said conduit proximate to said injector.

4. The chemical reaction apparatus of claim 3, wherein said heat transfer vessel comprises a plurality of heat transfer zones.

5. The chemical reaction apparatus of claim 3, further comprising catalyst in the interior of at least one of the tubular reaction zones.

6. The chemical reaction apparatus of claim 1, wherein said interior conduit is concentric with said tubular reaction zone.

7. The chemical reaction apparatus of claim 3, wherein said interior conduit is concentric with said tubular reaction zone.

8. The chemical reaction apparatus of claim 1, further comprising pressure drop control means in said conduit proximate to atetach of said injectors.

9. The chemical reaction apparatus of claims 3, further comprising pressure drop control means in said conduit proximate to at least one of each of said injectors.

10. The chemical reaction apparatus of claim 3, wherein said heat transfer vessel is a cylindrical vessel.

11. The chemical reaction apparatus of claim 1, further comprising a catalyst bed within said tubular reaction zone and surrounding said interior conduit.

12. The chemical reaction apparatus of claim 3, further comprising a catalyst bed within each of said tubular reaction zones and surrounding said interior conduits.

13. The chemical reaction apparatus of claim 1, wherein said multiplicity of injectors comprises between 2 and 40 injectors.

14. The chemical reaction apparatus of claim 1, wherein said tubular reaction zone has a cross-section which is a substantially circular, said interior conduit is concentric with said tubular reaction zone and said tubular reaction zone comprises a catalyst bed surrounding said interior conduit.

15. The chemical reaction apparatus of claim 3, wherein each of said tubular reaction zones has a cross-section which is a substantially circular, said interior conduits are concentric with said tubular reaction zones and each of said tubular reaction zones comprises a catalyst bed surrounding said interior conduit.

16. A continuous flow chemical reaction apparatus comprising a fluidized bed reaction zone having a height and having a first fluid feed inlet at a lower end and a product outlet at an upper end, said fluidized bed reaction zone having a multiplicity of injectors in fluid communication with an interior conduit extending vertically within said fluidized bed reaction zone and located within the fluidized bed reaction zone and at least two different heights thereof, each of said injectors capable of introducing a controlled amount of a second fluid reactant into said fluidized bed reaction zone, and at least one of said injectors having a pressure drop control means in said conduit proximate to said injector.

17. The apparatus of claim 16, wherein said fluidized bed reaction zone operates in the bubbling regime.

18. A continuous flow chemical reaction apparatus comprising a plurality of fluidized bed reaction zones within a heat transfer vessel having at least one heat transfer zone, each of said heat transfer zones having a heat transfer fluid inlet and a heat transfer fluid outlet; each of said fluidized bed reaction zones having a height, a first fluid feed inlet at a lower end, a product outlet at an upper end and a multiplicity of injectors in fluid communication with an interior conduit extending vertically within said fluidized bed reaction zone and located within said fluidized bed reaction zones at least two different heights thereof and each of said injectors being adapted to introduce a controlled amount of a second fluid reactant into said fluidized bed reaction zones, and at least one of said injectors having a pressure drop control means in said conduit proximate to said injector.

19. A continuous flow chemical reaction apparatus comprising a fluidized bed reaction zone having a height, a first fluid feed inlet at a lower end, a product outlet at an upper end and a multiplicity of conduits along the height of said fluidized bed reaction zone, each of said conduits being perpendicular to fluid flow within the fluidized bed reaction zone and each being adapted to introduce a controlled amount of a second fluid reactant feed into said fluidized bed reaction zone.

* * * * *